Oct. 23, 1951  R. C. WYSS  2,572,419
LOCK FOR IRRIGATION PIPE COUPLERS
Filed March 21, 1949
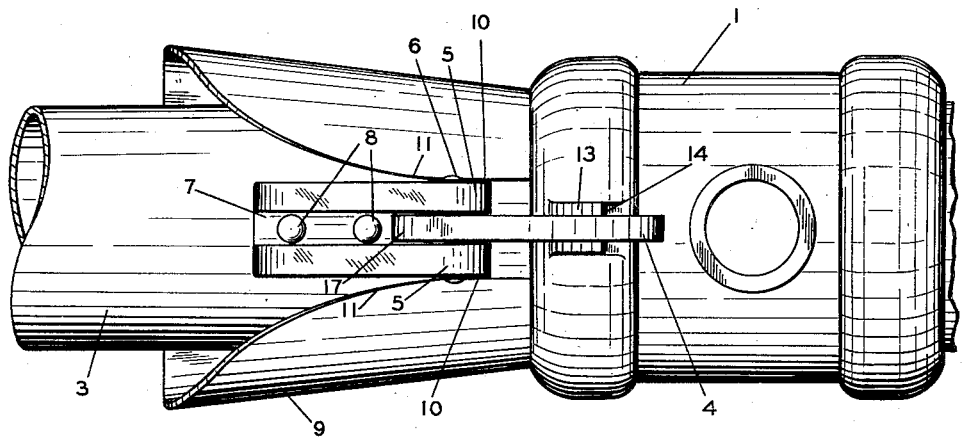
Fig. 1
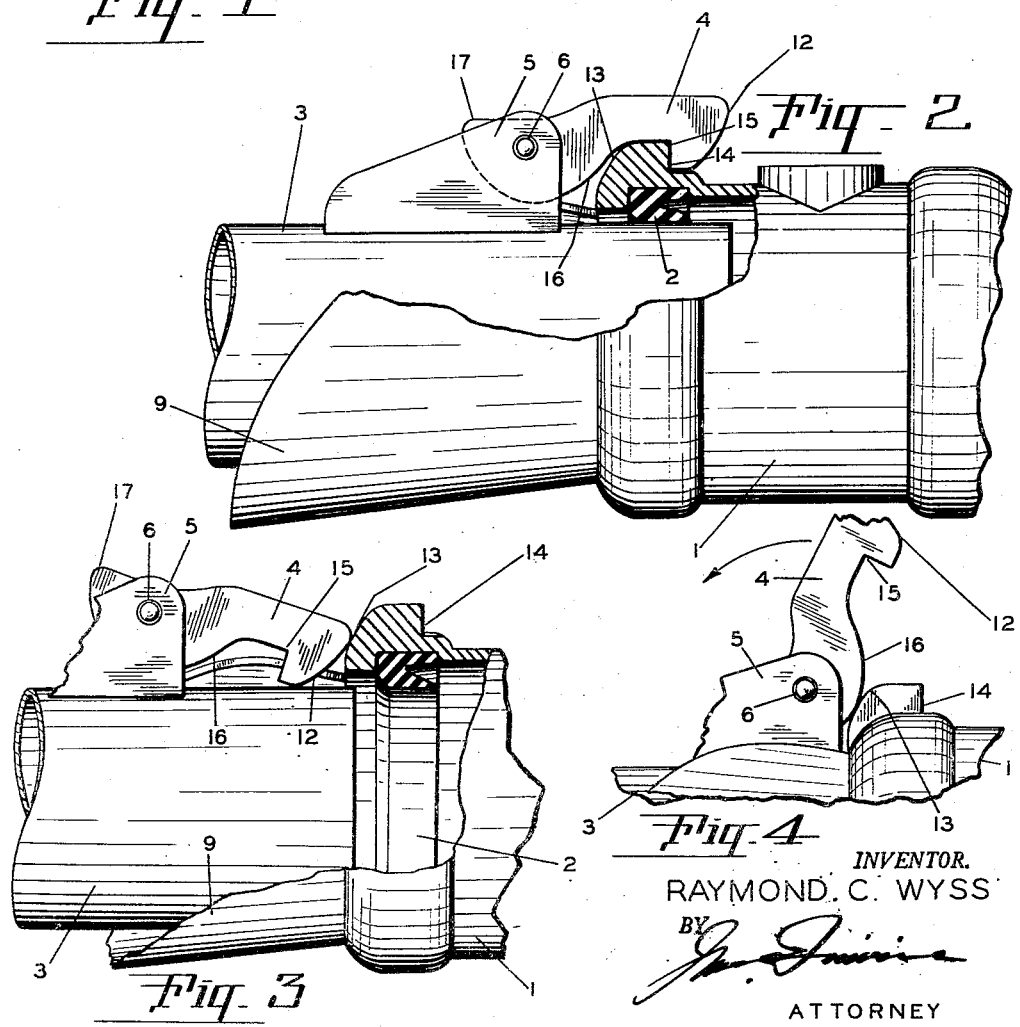
INVENTOR.
RAYMOND. C. WYSS
BY
ATTORNEY Patented Oct. 23, 1951

2,572,419

UNITED STATES PATENT OFFICE 2,572,419

LOCK FOR IRRIGATION PIPE COUPLERS

Raymond C. Wyss, Tillamook, Oreg.

Application March 21, 1949, Serial No. 82,625

6 Claims. (Cl. 285—170)

1

My invention relates to locks for pipe couplers and particularly to couplers used in irrigation pipe lines.

The primary object of the invention is to provide a lock or latch for holding the pipes within the couplers that can be latched merely by pushing the pipe from its outer or remote end axially into the coupler when axially in line therewith or not and released by the operator from the outer or remote end of the pipe without having to go near the coupler in order to release the latch by similarly pushing the pipe further into the coupler while in coupled position to disengage the latch and by quickly pulling back or out on the pipe to permit withdrawal and removal of the pipe from the coupler, the release of the latch being accomplished without raising or turning the pipe, and which by a simple construction of the latch, positively causes and limits the raising of the latch in disengaged position to a point ahead or short of an upright position so that it will be prevented from swinging back over the dead center or all the way back to such a position as to require it to be manually engaged and whereby it will always be in a position to drop automatically by gravity to engaged position behind its keeper on the coupler.

Heretofore when a latch type of lock has been employed it has been necessary for the operator to manually unlock the latch at the coupling, this has required considerable extra effort and time, but with my new and improved latch he can remain at the opposite end of the pipe where he has control over engaging the pipe into the coupler or removing the same from the coupler.

These and other incidental objects will be apparent in the drawings, specification and claims.

Referring to the drawings:

Figure 1 is a plan view of my new and improved pipe coupler lock.

Figure 2 is a side view of Figure 1, parts broken away for convenience of illustration, the latch being shown in locked position.

Figure 3 is the same as Figure 2 except that the coupling is about to be made, or is being disconnected.

Figure 4 is a fragmentary detail view illustrating the operation of the locking latch.

Referring more specifically to the drawings:

The conventional pipe coupler or coupling sleeve is shown at 1, having the usual rubber seal 2 therein and rounded annular external end ribs. The pipe to be connected is indicated at 3 and in Figures 1 and 2 is in the normal connected position, while in Figure 3 the same is being

2 either inserted or disconnected from the coupler. A latch 4 of the hook type is pivotally mounted to the bracket 5 at 6, the radially outstanding bracket 5 being fixedly secured to the pipe 3 spaced from the end thereof by its base 7, which may be riveted to the pipe as by the rivets 8, or by any other suitable means. The best method thus far has been to secure the bracket to the pipe as illustrated due to the fact that the pipe is of a very thin material.

My new and improved locking latch is particularly adapted to be used in connection with a coupler having a flared skirt 9 formed thereon and extending from one or both open ends with a longitudinal outwardly flaring entrance opening as shown. When the pipe 3 is inserted into the coupler the bracket 5 passes into the entrance opening, the sides 10 of the bracket 5 being guided between the edges 11 of the entrance opening of the skirt 9 to maintain the pipe and couplers so that their risers adapted to extend from the coupler 1 at the branch connection indicated, will be held in a vertical position at all times to maintain all of the risers of the pipe line in alignment with each other.

The latch has an inwardly and rearwardly inclined sloping face or rounded nose surface 12 which engages the sloping surface or rounded outer edge 13 of a cam-shaped radial keeper lug at the top of the rib which is inclined in the same direction as the nose or surface 12 of the coupler 1 at an external annular end rib thereof. This raises and guides the latch 4 over the radially extending keeper lug and in latching engagement with the inside or back of the lug at radial shoulder 14 opposite the rounded cam face or edge 14 when the coupling is made engaging the hook bill or notch 15 of the latch, preventing the pipe from being withdrawn, as best illustrated in Figures 1 and 2.

Referring to Figure 4, when the pipe 3 is coupled as in Figs. 1 and 2 and the operator takes a hold of the outer end of the pipe 3 and pushes it forward the depending cam portion or substantially semi-circular inwardly extending convexly rounded bottom edge surface or humped portion 16 below an eccentric to the pivot axis 6 and spaced from the hook portion or bill of the latch 4 and extending downwardly from and merging with the bottom edge of the reduced shank thereof on a reverse or ogee curve which conforms with the top of the cam shaped lug, will strike the sloping surface 13 of the coupler and ride or slide thereon to cause the latch to swing upwardly to a point ahead or short of an upright position or raising the same as illustrated, and due to the momentum imparted to the latch, in the direction of the arrow, it will raise to the position shown in Figure 4, then by quickly pulling back on the pipe 3, the pipe may be removed from the coupling before the hooked bill and notch 15 of the latch has had time to drop down over the shoulder 14. In Figure 3 the latch 4 is shown in position after the pipe 3 is quickly pulled back and the latch has dropped down from the position shown in Figure 4 to released position to permit uncoupling and removal of the pipe 3 by the operator at the outer end of the pipe remote from the latch without going near the coupler and manually raising the latch or requiring that the pipe 3 be raised or turned in order to release the latch. Figure 3 also shows how the rearwardly inclined rounded nose or cam surface 12 at the forward edge of the latch 4 engages the rearwardly inclined or rounded outer cam surface 13 of the keeper lug at the top of the open end and annular rib of the coupler 1 to slide or ride upwardly thereon while swinging on the pivot 6, by inserting and pushing the pipe 3 into the coupling sleeve 1 to hook the latch over the lug. Then, by pushing the pipe 3 further into the coupler 1, the outwardly spaced cam surface or humped portion 16 engages the rounded or cam surface 13 of the keeper lug on top of the coupler 1 to slide or ride thereon and swing the latch upwardly on the pivot 6 to a point ahead or short of an upright position as shown in Figure 4 limited by engagement of the stop or heel 17 with the base 7 of bracket 5, so that by pulling slowly and slightly outwardly on the pipe 3, the latch 4 is allowed to drop down with a delayed action by gravity of its weight so that its hook or bill will engage over the keeper lug with the notch or edge 15 engaging the shoulder 14 of the lug as shown in Figures 1 and 2 to securely hold the pipe 3 in liquid tight connection with the coupling sleeve 1. In releasing the latch 4 after it has been raised as shown in Figure 4, the pipe 3 is quickly pulled back or outwardly from its outer end remote from the coupler 1 so that the latch 4 will automatically drop with its nose 12 in front of the lug surface 13 as seen in Figure 3, whereby the pipe end may be readily withdrawn or removed from the coupler without having to go near the coupler 1 and latch 4 to manually raise and release the latch hook or nose from the keeper lug shoulder 14, or to raise or turn the pipe 3 in order to release the latch to permit uncoupling and withdrawal or removal of the pipe from the coupling sleeve 1. This is the object of my invention, the fact that the pipe can be removed while the latch is in the position illustrated in Figure 4 by quickly withdrawing the pipe from the coupler.

The travel or upward swing of the latch 4 to a point ahead or short of an upright position in disengaged or released position as seen in Figure 4 is restricted by the rearwardly extending tail or heel portion 17, which engages the outer surface of the base 7 of the bracket 5 attached to the pipe 3, to limit the biasing or raising of the latch as illustrated. The cam surface or humped portion 16 is not only spaced from the hook of the latch 4, but of decreasing eccentricity from the shank thereof toward its intermediate portion and then substantially concentric to the pivot 6 and finally increasing in eccentricity toward the rearwardly extending tail or heel portion 17 in which the cam or humped portion 16 terminates at its top edge and outer end. When the pipe is inserted it is done in a normal manner. After the same has reached its forward position the latch will be hooked over the lug as seen in Figures 1 and 2 and notch 15 will engage in back of the shoulder 14 maintaining the pipe in its connected position.

I have not illustrated how the coupler 1 is connected to the oppositely disposed pipe, usually it is solidly connected thereto, or it may have the same kind of a connection as I have just described. I do not wish to be limited to exactly how the opposite end is applied to the oppositely disposed pipe, as the object of my invention is the manner in which I remove the pipe from the coupler or connect the same in the making up of the pipe line, and my invention is adapted to be used as stated above on either one end of the coupler or on both ends.

What I claim is:

1. A pipe coupling comprising a pipe section on the free end of which is a flaring skirt, the edges curving inwardly toward the top, and terminating in parallel side walls, the interior of said pipe section back of the skirt having a packing gland, a rib on the pipe section adjacent the inner end of the skirt, a cam shape lug on the top of the rib, a second pipe section fitted in the skirt and the first-mentioned pipe section to engage the packing, a pair of lugs on the second-mentioned pipe section spaced from the rib on the first-mentioned pipe section, a latch pivoted between the pair of lugs on the second-mentioned pipe section the forward edge of the latch having a cam surface and the rear end of the latch having a cam, said latch extending over the rib with its front end cam surface engaging the cam shape lug on the rib, the latch having a cam bottom edge to cooperate with the front edge of the cam shape lug and rib to disengage said latch from the lug when the second-mentioned pipe section is forced into the end of the first-mentioned pipe section when disconnecting the pipe sections the cam at the rear end of the latch engaging the bottom surface between the lugs to frictionally hold the latch in disengaged position after release from the lug, the parallel side walls of the skirt serving to guide the pair of lugs and the latch when coupling the two pipe sections.

2. A pipe coupling comprising a pipe, a longitudinally extending hook latch pivoted on the pipe and having a sloping hook end, a reduced shank and an inwardly extending continuously convex cam portion, and a coupling sleeve to receive an end of the pipe therein, said sleeve having a radial keeper lug in longitudinal alignment with the latch with a sloping front face extending in the same direction as and opposing the hook end and a radially extending shoulder at the back, whereby when the pipe is inserted and pushed into the sleeve, the sloping hook end engages and rides up on the sloping front face of the lug to hook in back of the radial shoulder and thereafter upon further insertion of the pipe into the sleeve the convex cam portion engages and rides upon the sloping front face of the lug to swing the latch upwardly to a point slightly short of an upright position so that by pulling out quickly on the pipe, the latch will drop in front of the lug to release the latch so that the pipe may be withdrawn from the sleeve.

3. A pipe coupling as defined in claim 2, wherein the convex cam portion is provided with an extended tail portion at the outer end thereof to engage the pipe to limit the raising of the latch to said point short of an upright position.

4. A pipe coupling comprising, in combination, a pipe, a bracket fixed to the top of the pipe spaced from an end thereof, a longitudinally extending hook latch having an inwardly and rearwardly inclined nose at its front end, a shank forming a notch at the back of the hooked end and a depending cam portion with a convex bottom edge merging with the bottom edge of the shank on an ogee curve and terminating in an extended heel at the other end, said latch being transversely pivoted to the bracket near the center of the cam portion, and a coupling sleeve for receiving said end of the pipe and having a flared skirt extending from an open end thereof with an entrance opening and a radially extending keeper lug at the top with a transverse radial shoulder at the back and a front face inclined in the same direction as the nose, said entrance opening guiding the bracket and latch in alignment with the lug, said nose engaging the inclined front face of the lug when the end of the pipe is inserted into the sleeve to partly raise the latch for engagement of its nose over the radial shoulder, and the convex bottom edge of the cam portion thereafter engaging said front face to further raise the latch to a point ahead of an upright position so that by quickly pulling outwardly on the pipe the latch will drop in front of the lug whereby the pipe may be removed from the sleeve, said extended heel engaging the bracket to limit the raising of the latch to said point ahead of an upright position.

5. A pipe coupling comprising a pipe, a bracket attached to the pipe, a longitudinally extending latch pivoted transversely to the bracket, said latch having a depending rounded nose with a notch at the back, a reduced shank and a depending substantially semi-circular convex cam portion below the pivot spaced from the nose, and a coupling sleeve for receiving the end of the pipe and having a radially extending lug with a rounded front face and a radial shoulder at the back, said nose engaging the front face of the lug when the pipe end is inserted axially into the sleeve to raise the latch for engagement of its nose and notch over the lug shoulder to hold the pipe and sleeve connected, and the bottom edge of the cam portion engaging the rounded front face of the lug to raise the latch to a point short of an upright position when the pipe end is pushed further into the sleeve, whereby upon quickly pulling back on the pipe at its end remote from the sleeve, the latch will drop down in front of the lug to allow withdrawal of the pipe from the sleeve.

6. A coupling as defined in claim 5, wherein the sleeve has a longitudinal pipe end receiving member extending therefrom with a longitudinal edge to engage the bracket and guide the pipe end into the sleeve with the latch in axial alignment with the lug, and the depending cam portion of the latch having an extended tail at the outer end of its top edge to engage the bracket and limit the raising of the latch to said point short of an upright position whereby it will always fall forwardly by gravity when pulled back over the lug to release the latch without raising or turning the pipe or manually raising the latch.

RAYMOND C. WYSS.

REFERENCES CITED

The following references are of record in the file of this patent:

UNITED STATES PATENTS

| Number | Name | Date |
|---|---|---|
| 2,244,396 | Kellaher | June 3, 1941 |
| 2,464,466 | Stout | Mar. 15, 1949 |
| 2,470,539 | Wyss | May 17, 1949 |